April 21, 1964 J. RABINOW 3,129,946

PHONOGRAPH ARM

Filed Nov. 30, 1961 3 Sheets-Sheet 1

INVENTOR.
Jacob Rabinow
BY Joseph A. Genovese &
Max L. Libman

Fig. 4
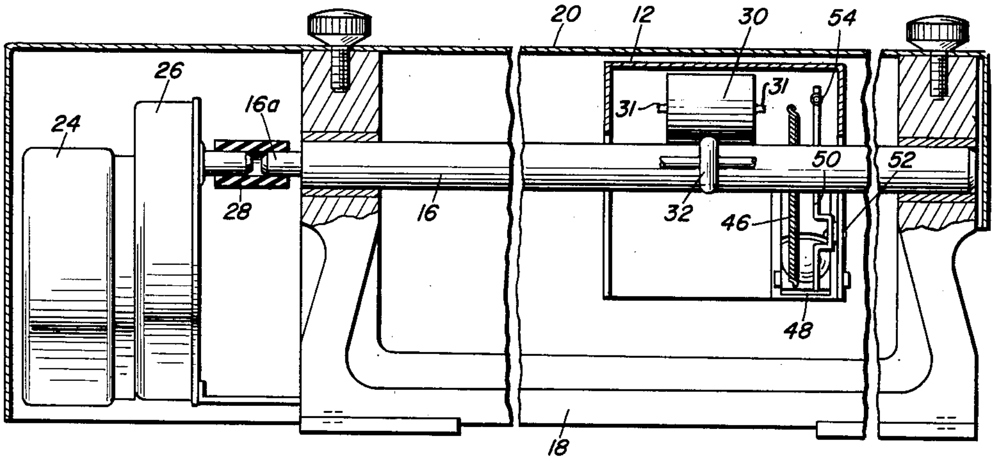
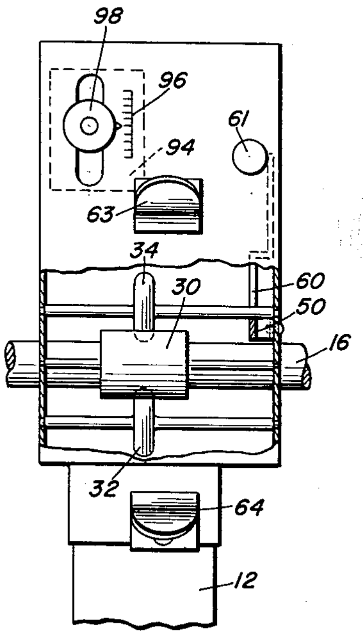
Fig. 5
Fig. 6
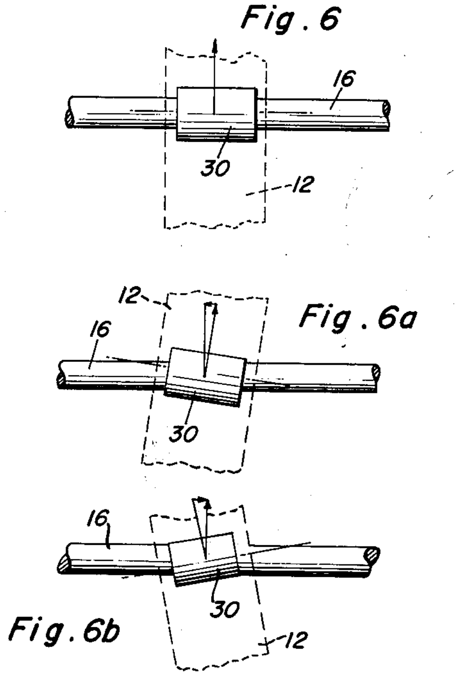
Fig. 6a, Fig. 6b
INVENTOR.
Jacob Rabinow
BY Joseph A. Genovese & Max L. Libman April 21, 1964

J. RABINOW 3,129,946

PHONOGRAPH ARM

Filed Nov. 30, 1961

3 Sheets-Sheet 3

INVENTOR.
Jacob Rabinow

BY Joseph A. Genovese & Max L. Libman 3,129,946
PHONOGRAPH ARM

Jacob Rabinow, Takoma Park, Md., assignor, by mesne assignments, to Control Data Corporation, Minneapolis, Minn., a corporation of Minnesota Filed Nov. 30, 1961, Ser. No. 156,057
21 Claims. (Cl. 274—23)

This invention relates to phonograph arms and particularly to straight-line motion arms of the type designed to eliminate tracking errors commonly present in conventional pivoted tone arms.

My prior Patent No. 2,915,315 discusses previous attempts to eliminate tracking error by special mechanisms for maintaining the stylus tangent to the part of the record groove which the stylus tracks, and discloses one solution to this problem. A typical prior solution to this problem involves a straight line track on which the pickup rides. The track is so positioned that the stylus path passes through the center of the record. Although this eliminates tracking error, such systems, unfortunately, have much more friction than the commonly used pivoted tone arm. Since the grooves of records vary from record to record and indeed, the pitch of the groove of a single record is not a constant, it is not practical to use a screw to propel a tone arm in a radial path over the record. If desired, special servo systems such as disclosed in my Patent No. 2,915,315 may be used in combination with a suitable driver such as a fixed pitch screw.

The geometry of offset arms is more favorable than ordinary pivoted tone arms, but it is still an engineering compromise regarding tangency to the entire groove of the record. Furthermore, in offset arms and ordinary pivoted arms objectionable side pressures (stylus-to-groove side wall) are generated. Many other prior systems attempted to produce zero tangency error, but they did not eliminate the angle between the head and the "line of tension" between the stylus and the arm pivot.

An object of my invention is to provide a tone arm which eliminates tracking error and undesirable side pressure between the stylus and a wall of the record groove which exist in using ordinary tone arms. I accomplish this by a bi-directional servo discussed below.

My bi-directional servo includes a steering roller connected with the tone arm and mounted so as to contact a rotary shaft located adjacent to the record turntable. As long as the axis of rotation of the roller is parallel to the shaft, the roller-supported part of the tone arm will remain at a given position on the shaft with the roller simply idling. However, when the axis of the roller is skewed even very slightly with respect to the axis of the rotary shaft, the tone arm is moved axially on the shaft. This motion is analogous to the sideways motion of a steering wheel of a vehicle running on a treadmill. The sideways velocity is caused by the angle between the plane of the wheel and the direction of motion of the treadmill. This velocity persists so long as the axis of the roller is skewed. When the skew angle increases, as for example a "drastic" change in pitch of the record groove, the steering component of force correspondingly increases to move the tone arm parallel to the shaft at a higher rate. If there are times in the playing of the record that the roller is not skewed with respect to the rotary shaft, there is no component of force tending to displace the roller (and hence the tone arm) along the shaft. It is now apparent that my rotary shaft-roller system functions somewhat like a nut on a screw with a specially cut thread to suit the pitch including all of its changes, of a record. It is further apparent that my shaft-roller system differs from a specially cut screw because the same shaft and roller will enable the tone arm to track, and correct for tracking error, any conventional record regardless of the pitch and pitch variations of the groove.

Another object of my invention is to provide my tone arm assembly with means to elevate the stylus end of the arm in response to arm-excursions greater than a predetermined angularity. Thus, when the stylus tracks the run-out groove of a record, the above means react to lift the stylus off the record.

One of the features of the arm lifting means is that of simplicity. All this is required is a trip or latch mechanism which becomes released when a part thereof engages the rotary shaft during large arm deflection as the stylus tracks the run out groove. The release of the latch can cause a number of different functions such as the movement of a counterweight, the closing of the switch (or both), etc. Should I desire to incorporate a rapid return for the arm, it also may be triggered by or concurrently with the operation of the latch.

Another object of the invention is to provide a straight-line motion tone arm assembly as above where the vertical stylus force can be made very low, for instance, less than a gram. Conventional pivoted tone arms require a certain amount of stylus force to prevent the stylus from jumping out of the groove where the side force on the stylus is appreciable. My bi-directional servo eliminates tracking error and side pressures, and therefore there is no corresponding stylus pressure requirement to keep the stylus in the record groove. The only vertical force required is the force to overcome the impedance of the stylus.

Other objects and features of importance will become apparent in following the description of the illustrated forms of my invention.

FIGURE 4 is an elevational view, parts broken away in section, showing the tone arm and rotary shaft and means for rotating the shaft.

FIGURE 5 is a fragmentary top view with parts broken away, showing particularly the means of mounting the tone arm on the rotary shaft.

FIGURE 6 is a view showing the tone arm perpendicular to the rotary shaft and an arrow indicating the rotational component of force applied to the steering roller from the shaft.

FIGURE 6*a* is a view similar to FIGURE 6 and showing the tone arm skewed and producing a force component in a direction to move the tone arm axially on the rotating shaft. The skew position of the tone arm in FIGURE 6 is greatly exaggerated.

FIGURE 6*b* is a view similar to FIGURE 6 and 6*a* but showing servo correction in the direction opposite to that of FIGURE 6*a*.

Figures 1, 2, 3, 7:
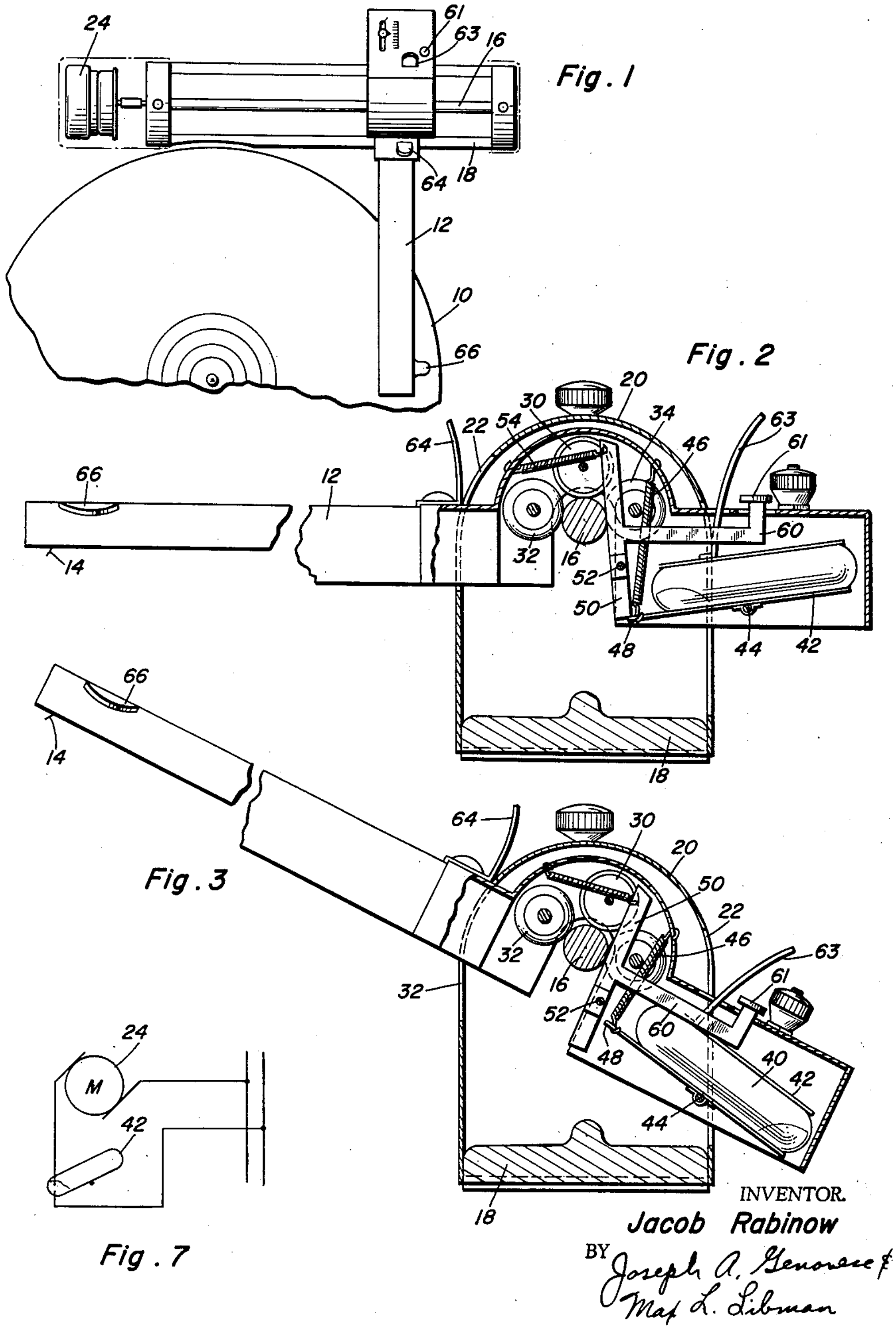
FIGURE 1 is a top view of a turntable and my straight-line motion tone arm assembly.
FIGURE 2 is a side view of my assembly, parts broken away in sections to illustrate otherwise obscure detail. This view shows the tone arm in the position at which the record on the turntable would be tracked by the stylus.
FIGURE 3 is a view similar to FIGURE 2 but showing the tone arm in an elevated position.

FIGURE 7 is a diagrammatic view showing that the counterweight in the embodiment of FIGURE 1 may be used as a switch.

Figures 8, 9, 10, 11:
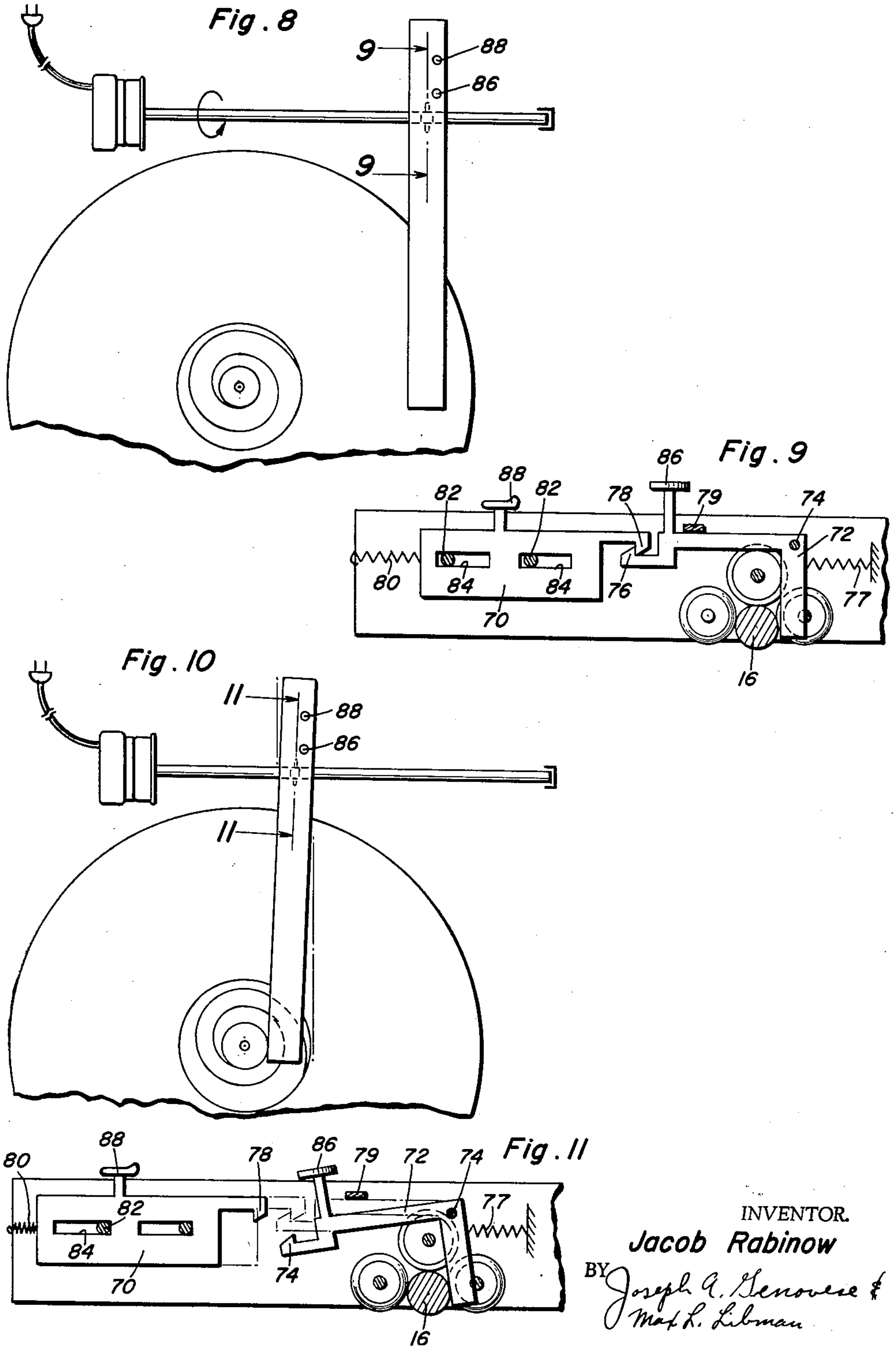

FIGURE 8 is a top view of another form of my invention.

FIGURE 9 is an enlarged section taken on line 9—9 of FIGURE 8 and showing a modification of the latch for releasing the counterweight which elevates the stylus end of the arm.

FIGURE 10 is a top view similar to FIGURE 8 but showing the tone arm with the stylus tracking the run-out groove of a record.

FIGURE 11 is an enlarged sectional view taken on line 11—11 of FIGURE 10.

Attention is directed first to FIGURES 1–7. A conventional turntable 10 is shown in FIGURE 1, and it is adapted to support and rotate a conventional record in the usual way. Tone arm 12 is mounted adjacent to the turntable and has a stylus 14 to track the groove of the record. Tone arm 12 is supported on a rotary shaft 16 mounted parallel to the plane of the turntable. The ends of shaft 16 (FIGURE 4) are mounted in bearings attached to a suitable frame 18 which is secured adjacent to the turntable. Although the frame is shown (FIGURE 1) mounted very close to the edge of the turntable, it is understood that the frame could be mounted farther away or mounted over a part of the turntable. This would necessitate a different shape frame and changing the length of the tone arm because the stylus of my tone arm tracks along a radial line between the axis of rotation of the record and the edge of the record parallel to shaft 16. FIGURE 4 shows a cover 20 detachably secured to frame 18 and having front and rear slots 22 (FIGURES 2 and 3) through which tone arm 12 extends. The cover encloses driving motor 24, reducer 26 operated by the motor and coupling 28 which connects the output spindle of the speed reducer to the end 16*a* of shaft 16.

The tone arm is supported on shaft 16 by a nest of three rollers 30, 32, and 34, of which only roller 30 is of major importance. The rollers 32 and 34 could be substituted by wipers or the like, since their only function is to maintain roller 30 on shaft 16. The roller 30 is attached by shaft 31 or other suitable means to the tone arm, and is used to move the tone arm longitudinally of shaft 16 as shown in FIGURES 6 and 6*a*. When the roller 30 is disposed as shown in FIGURE 6, that is with its axis of rotation parallel to the axis of shaft 16, roller 30 simply idles. However, when the stylus tracks the record groove, the tone arm changes angle in a horizontal or almost horizontal plane very slightly. The amount of angle change or horizontal tilt is exaggerated in FIGURE 6*a*. When it tilts, the axis of roller 30 becomes skewed with respect to the axis of shaft 16. As a consequence, there are two force components involved. One tends to rotate the roller 30 and the other is at right angles thereto i.e., in a direction tending to restore the tone arm to such position that the skew is removed. In so doing, the shaft-supported end of the tone arm is moved along shaft 16. One of the important features of my system is that the horizontal component of force (FIGURE 6*a*) which moves the tone arm along shaft 16 is produced by a steering action where the roller 30 always moves to a position at which its axis is parallel to the axis of the driver, i.e. shaft 16. Thus, the roller 30 on shaft 16 has the effect of moving the outer end of the tone arm to eliminate tracking errors as the stylus tracks the record groove. Since the movement of the outer end of the tone arm can be in either direction on shaft 16 (see FIGURES 6*a* and 6*b*) (depending on the skew direction of roller 30), the roller 30 on shaft 16 constitutes a mechanical bi-directional servo for the tone arm to eliminate tracking errors.

I have indicated that the axis of roller 30 is normal to the axis of the tone arm, and when constructed in this way the various advantages of my invention are realized. As a design refinement, the axis of roller 30 (established by its shaft 31) can be at a very small skew angle to the tone arm to build-in a velocity error. According to servo theory there must be a velocity error before the servo will operate to make a correction and my servo is ideally suited to have the velocity error built in by attaching the roller 30 to the arm at a very slight skew angle. Since most records being bought at this time are 33 r.p.m., the slight angle could be made to suit the playing of these records.

The question of friction is important. In the common pivoted arms, the usual variation of pitch and eccentricity of the record require the tone arm to overcome static friction at the pivot. In my tone arm there is no such static friction to overcome. Shaft 16 and roller 30 always rotate so that I have only rolling friction to be concerned with.

When the tone arm tracks the run-out groove (see FIGURE 10) of the record, the tone arm skews sharply because the servo, by design, cannot keep up with this fast motion, and this motion is used to trigger the lifting of the stylus from the record (FIGURE 3). There are a number of ways that I can accomplish this, one of which is shown in FIGURES 2–4. I have a mercury container 40 supported by holder 42 and used as a counterweight. The holder is mounted for pivotal movement on a spindle 44 carried by or attached to a part of the tone arm on the side of shaft 16 opposite to that of the stylus 14. The counterweight holder is biased upward by a spring 46 secured to an upper part of the tone arm body and to an end of the counterweight holder. This same end is used as a latch keeper 48 by engaging a latch release arm 50 which is mounted on a pivot 52. The pivot is suitably secured to a part of the tone arm body so that one edge of the arm 50 is normally very close to the rotary shaft 16. A spring 54 attached to the upper end of arm 50 and to the tone arm body biases the arm so that the lower end engages and locks the keeper 48 in the playing position. Then, when the arm is skewed a considerable amount, as when the stylus tracks the run-out groove of the record, shaft 16 pushing against arm 50 causes the arm to pivot and thereby release keeper 48. This allows spring 46 to lift the holder 42 and its counterweight (FIGURE 3), and cause the mercury pool to run to the outer end thereof. The movement of the pool of mercury is sufficient to overbalance the arm and lift the stylus.

An extension arm 60 is attached to arm 50 and has a push button 61 accessible from the exterior of the tone arm. Accordingly, should one desire to have the tone arm lifted before it reaches the run-out groove, all that is required is that the push button be depressed which will pivot arm 50 in a direction to release keeper 48. To reset the counterweight, i.e. move it from the position shown in FIGURE 3 to the position shown in FIGURE 1, it is only necessary to move finger grip 63 (conveniently by grasping finger grips 63 and 64 concurrently with two fingers), and the movement of grip 63 pivots the counterweight and holder 42 (to which grip 63 is attached) about pivot 44 causing the outer edge of keeper 48 to slide downwardly along the inner edge of arm 50. Thus, the arm pivots against the yielding opposition of spring 54 until the keeper assumes a position beneath the lower extremity of arm 50. To manually lift the stylus end of the arm, finger grip 66 can be used. Since the embodiment of FIGURES 1–7 uses a mercury vial, it may be used as a switch, for example, in a simple circuit shown in FIGURE 7, to control the operation of motor 24 and/or to perform other electrical control functions.

Attention is now directed to FIGURES 8–11. Since the motor, shaft, frame, turntable, etc., are the same for the embodiments of FIGURES 1–7 and 8–11, the repetitive parts are either omitted or merely diagrammatically shown. The distinction between embodiments is in the type of counterweight which is used. Thus, FIGURES 9 and 11 show counterweight 70 adapted to slide axially of the tone arm when released by the action of arm 72 pressing against shaft 16, for instance, during run-out as shown in FIGURE 10. The arm 72 is mounted on a pivot 74 and is in the form of a crank so that when the arm pivots in one direction the latch 76 at the opposite end of the arm swings downwardly (FIGURE 11) to thereby release the latchkeeper 78 therefrom. Spring 77 pressing on arm 72, and stop 79 for the arm establish the normal position for the arm. Latch 76 is in the form of a dog whose normal position is behind the keeper 78.

The counterweight 70 is biased in one direction by a tension spring 80, although it is apparent that I can use a different spring arrangement. Upon release of the latch 76 and keeper 78, the spring 80 pulls the counterweight 70 away from shaft 16 causing the tone arm to be unbalanced in a direction to lift the stylus end thereof. The counterweight is constrained in its movement, for instance, by one or more pins 82 attached to the arm and passed through slots 84 in the counterweight. Other guiding means may be used.

The manual release is easily obtained in this form of the invention by simply having a push button 86 attached to arm 72 and accessible from the exterior of the tone arm. By pushing this button, the same pivot action of arm 72, as described above, is obtained. To reset the counterweight, a slide button 88 is attached to the counterweight and extends through a slot in the top cover of the arm so as to be accessible. By moving the slide in the proper direction as shown in dotted lines in FIGURE 11, the sloped surfaces of the latch 76 and keeper 78 slide over each other and allow the latch and keeper to become engaged as shown in FIGURE 9. The operation of this form of the invention, apart from that discussed immediately above, is identical to that of the previously described embodiment.

I can include many other features in my arm. For example, my arm may be counterweighted by conventional weight 94, (FIGURE 5) or by the damper and counterweight disclosed in the Rabinow Patent No. 3,031,196. I prefer graduations 96 on the body of the tone arm, and means such as a screw and nut 98 to adjust counterweight 94 for stylus force on the record groove. The steering roller need not be mounted directly on the tone arm. It may be mounted on a carriage such as shown in my prior Patent No. 2,915,315 and be connected to the arm by suitable linkage. In this type of assembly, I can use a balanced arm and a spring to exert the necessary vertical force on the stylus. Thus all variations and modifications within the scope of the claims may be resorted to.

I claim:

1. In a record player, a tone arm having a stylus to track the groove of a record, and mechanical bi-directional servo means connected with said arm to move the arm so that tracking error is eliminated as the stylus tracks said groove, said servo means including a rotary shaft, and rolling means supporting said tone arm on said shaft and responding to skew of said tone arm relative to said shaft to displace said tone arm to a predetermined relationship to the record groove as the record moves.

2. In a record player having a turntable to rotate a record in a first plane and about an axis of rotation, a a straight-line motion tone arm assembly adjacent to said turntable and including a tone arm provided with a stylus to track the record groove, a rotary shaft parallel to said plane, mechanical means operatively connected with said tone arm and engaging said shaft for moving said tone arm at required rates and in required directions to eliminate tracking errors and compel the stylus to travel a substantially straight line radially across the record, said mechanical means including a free turning roller connected with said tone arm and driven by said rotary shaft so that the tone arm-to-shaft coupling has only rolling friction, said roller idling when the axis thereof is parallel to said shaft, and said roller imparting a component of movement to said arm lengthwise of said shaft when said roller axis skews with respect to said shaft.

3. The subject matter of claim 2 wherein said roller axis skew is caused by the stylus tracking the spiral groove of the record, and means providing a control function when said skew exceeds a predetermined amount.

4. In a record player having a turntable to support a record provided with a groove, a tone arm having a stylus, mechanical means to support said tone arm and move said tone arm in a manner such as to avoid tracking error as the stylus tracks the record groove, said mechanical means including a bidirectional servo to move said arm in selected directions and at rates which correspond to those required to correct for record groove eccentricity and changes in groove pitch, said mechanical means and servo including a rotary shaft, means to continuously rotate said shaft, and a roller on said tone arm and driven by said shaft while said roller at least partially supports said tone arm on the shaft so that the frictional coupling between the tone arm and arm-supporting shaft is rolling friction.

5. The record player of claim 4 wherein said roller imparts forces on the tone arm in a direction to move the tone arm axially of said shaft, and the magnitude of said forces corresponding to the skew of the roller axis with respect to the shaft axis.

6. In a record player for records having a groove, a tone arm having a stylus to track the groove, and said tone arm being in a plane substantially tangent to the part of the groove which the stylus tracks, the improvement comprising a rotatable smooth shaft adjacent to the record, and means connected with said tone arm and spaced from said stylus and engaging said smooth shaft for supporting said tone arm and for moving said tone arm lengthwise of the shaft in response to skew of the tone arm from said substantially tangent relationship with the part of the record groove that is being tracked by said stylus.

7. The subject matter of claim 6 wherein the rate of said movement of said tone arm corresponds to the amount of said skew.

8. The record player of claim 6 wherein said means include a tone arm steering roller on said arm with an axis of rotation transverse to the tone arm, said roller being freely rotatable when the axis thereof if parallel to the axis of said rotating shaft, and when said roller is skewed the rotation imparted to said roller by said shaft provides a component of force on said roller in a direction which restores said axis to parallelism and thereby moves the tone arm lengthwise of said shaft so that the stylus tracks the record groove without tracking error.

9. The record player of claim 7 wherein the record has a run-out groove, and means responsive to the comparatively large excursion of the arm caused by the tracking of said run-out groove for lifting the stylus end of said tone arm.

10. In a record player for records having a groove with a run-out part at the end of the groove, and a tone arm with a stylus at one end adapted to track said groove, the improvement comprising a smooth rotating shaft adjacent to the record and in a plane parallel to the record, means including a nest of rollers on said arm and remote from the stylus to support said arm on said shaft for pivotal movement about the axis of said shaft, one of said rollers being a steering roller for moving the tone arm lengthwise of said shaft, said steering roller being free turning and driven by said shaft when its axis is parallel to said shaft, and said roller moving said tone arm axially of said shaft when the axis of said roller is skewed with respect to said shaft, where the skew is caused by the stylus tracking the normal record groove.

11. The record player of claim 10 and means responsive to the comparatively large skew of said tone arm caused by the stylus tracking said run-out part for lifting the stylus end of said tone arm.

12. The record player of claim 11 wherein said tone arm lifting means include a latch, and means engaging said shaft for releasing said latch.

13. In a record player for records having a groove, a tone arm with tracking means for the groove where the tracking means following the groove cause the outer end of the arm to traverse the record on a radius of the record; the improvement comprising a smooth shaft mounted adjacent to the record; means for rotating said shaft; means engaging said smooth rotating shaft for supporting said tone arm at a part of the arm spaced from said tracking means and also for propelling said arm lengthwise of said shaft in response to slight skew of the arm caused by the tracking means following said record groove, thereby eliminating tracking errors.

14. The subject matter of claim 13 and means for lifting an end of said tone arm, and means triggered by engagement with said shaft for actuating said arm lifting means.

15. The subject matter of claim 14 wherein said arm lifting means include a movably mounted counterweight, and means to move said counterweight.

16. The subject matter of claim 15 wherein said counterweight also operates an electrical switch, a motor to rotate said shaft, and motor circuit means controlled by said switch.

17. In a record player having a tone arm adapted to support a stylus to track the groove of a record, means responsive to the small force produced as the stylus tracks the groove thereby displacing the tone arm for providing a larger force to restore the tone arm to a predetermined position with respect to the portion of the groove being tracked, said means including a continuously rotating shaft from which said large force is obtained, and rolling means skewed by said small force and engaging said rotary shaft to derive said larger force from said shaft and apply the last-mentioned force to said arm in a direction to restore said tone arm to said predetermined position.

18. In a record player having a tone arm adapted to support a stylus at one end thereof to track the groove of a horizontally supported record, bis-directional servo means for moving said tone arm in a manner to correct for tracking error, said servo means including a shaft, means mounting said shaft in a horizontal plane adjacent to the record, rotating means for continually rotating said shaft, means including a roller for supporting said tone arm on said shaft, said roller being rotated by said shaft and having an axis of rotation spaced from the axis of said shaft, said roller being free turning when said axes are parallel and when the stylus end of said arm is moved left or right said roller is correspondingly skewed with respect to said shaft, thereby introducing force components derived from said rotary shaft to the tone arm in a direction corresponding to said skew to move the tone arm along the length of said shaft until the axes of said roller and said shaft become parallel at which said roller again becomes free turning.

19. In a record player for a record which is rotated in a plane, a tone arm adapted to support a stylus to track the record groove, the improvement comprising means to mount the tone arm adjacent to the record and to move the tone arm in a path so that the tone arm moves along a substantially radial line with respect to the record and the stylus remains substantially tangent to the portion of the groove being tracked, said means including a rotary shaft adjacent to the record, means for continually rotating said shaft, means supporting said tone arm on said rotary shaft, said supporting means including a roller which is continually rotated by said shaft and constitutes means to derive tone-arm propulsive force from said rotary shaft in response to skew of the tone arm introduced by the stylus tracking the record groove.

20. The record player of claim 19 wherein said tone arm supporting means include guide means on opposite sides of said roller which cooperate with said roller to form a nest in which said rotary shaft is disposed.

21. In a record player having a turntable to support a record which has a groove, and having a tone arm provided with a stylus, the improvement comprising: means to support said tone arm for translation and for angular pivotal movement, means operatively associated with said support means and with said tone arm for translating said tone arm and including mechanical servo means responsive to the pivot angle between said arm and said support means to apply a component of translation motion to said tone arm in a first direction to restore the pivot angle between said tone arm and said support means to a predetermined angular relationship in response to angular deviation therebetween in a first direction, and selectively to apply a component of translation motion to said tone arm in a second direction to restore the pivot angle between said tone arm and said support means to a predetermined angular relationship in response to angular deviation therebetween in a second direction.

References Cited in the file of this patent

UNITED STATES PATENTS 2,915,315 Rabinow ---------------- Dec. 1, 1959
2,948,538 Tomaselli ---------------- Aug. 9, 1960

FOREIGN PATENTS 820,016 Great Britain ------------ Sept. 16, 1959